United States Patent
Brenna (10) Patent No.: US 9,392,910 B2
(45) Date of Patent: Jul. 19, 2016

(54) INTERFACE FOR A HANDHELD KITCHEN APPLIANCE

(71) Applicant: KONINKLIJKE PHILIPS N.V., Eindhoven (NL)

(72) Inventor: Claudio Brenna, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/405,815

(22) PCT Filed: May 31, 2013

(86) PCT No.: PCT/IB2013/054496
§ 371 (c)(1),
(2) Date: Dec. 5, 2014

(87) PCT Pub. No.: WO2013/182961
PCT Pub. Date: Dec. 12, 2013

(65) Prior Publication Data
US 2015/0146497 A1 May 28, 2015

(30) Foreign Application Priority Data
Jun. 8, 2012 (EP) .................................. 12171325

(51) Int. Cl.
*A47J 43/07* (2006.01)
*A47J 43/08* (2006.01)

(52) U.S. Cl.
CPC .......... *A47J 43/0711* (2013.01); *A47J 43/0705* (2013.01); *A47J 43/082* (2013.01); *Y10T 403/591* (2015.01)

(58) Field of Classification Search
CPC .................................................. A47J 43/0711
USPC ................................................ 366/129, 344
See application file for complete search history.

(56) References Cited

U.S. PATENT DOCUMENTS 4,505,058 A * 3/1985 Peterson .......................... 37/459
5,048,996 A * 9/1991 DuBois et al. ................ 403/287
(Continued)

FOREIGN PATENT DOCUMENTS

CN 1187701 A 7/1998
CN 2588838 Y 12/2003
(Continued)

*Primary Examiner* — David Sorkin (57) ABSTRACT

The present invention relates to mounting of accessory parts to a main unit of a handheld kitchen appliance. In order to provide a facilitated way of operation, a handheld kitchen appliance interface (10) for releasably mounting of an accessory part to a main unit, comprising a body structure (12), an insertion opening (14), a locking device (16), and an activation device (18). The insertion opening is provided in the body structure for inserting an insert end of an accessory or of a main part of a handheld kitchen appliance. The locking device comprises at least one engagement element (20) moveably guided by the body structure and being movable between a first position (P1), in which the engagement element is provided to engage a locking element of an insert end of the accessory or the main part inserted into the opening to provide axial fixation of the insert end in relation to the body structure, and a second position (P2), in which the engagement element is provided to be disengaged to allow axial displacement of the insert end in relation to the body structure. The activation device comprises a button (24) for applying a manual release force. The locking device comprises at least one holding bracket (26) supported by the body structure in at least one fixation point (28) such that during an activation of the interface, the fixation point maintains stationary relative to the body structure. The at least one holding bracket comprises a bendable part (30) on which the engagement element is provided. Further, the manual release force causes a bending of the holding bracket resulting in a radially directed movement (32) of the at least one engagement element from the first to the second position.

13 Claims, 6 Drawing Sheets

(56) References Cited

U.S. PATENT DOCUMENTS

| | | | |
|---|---|---|---|
| 5,567,047 A | 10/1996 | Fritsch | |
| 7,066,639 B2 | 6/2006 | Naud | |
| 9,138,102 B2 | 9/2015 | Rosenwirth | |
| 2011/0232505 A1* | 9/2011 | Rosenwirth | A47J 43/0705 99/484 |

FOREIGN PATENT DOCUMENTS

| | | |
|---|---|---|
| CN | 201822690 U | 5/2011 |
| DE | 20006028 U1 | 8/2000 |
| EP | 1138239 A2 | 10/2001 |

\* cited by examiner

INTERFACE FOR A HANDHELD KITCHEN APPLIANCE

This application is the U.S. National Phase application under 35 U.S.C. §371 of International Application No. PCT/IB2013/054496, filed on May 31, 2013, which claims the benefit of European Application No. 12171325.9 filed on Jun. 8, 2012. These applications are hereby incorporated by reference herein.

FIELD OF THE INVENTION

The present invention relates to releasably mounting of an accessory part to a main unit of a handheld kitchen appliance, and relates in particular to a handheld kitchen appliance interface, a handheld kitchen appliance, and a method for releasing an accessory part from a main unit of a handheld kitchen appliance.

BACKGROUND OF THE INVENTION

In handheld kitchen appliances, for example handheld blenders, attachable accessories are used to provide a variance of use of the same appliance, for example bars, choppers, and the like are provided as accessories that can be releasably attached to a main unit, which may contain the motor, the electronic system as well as the housing. In order to allow an easy change of the respective accessories, depending on the user's particular needs or demands, a release mechanism may be provided that is activatable by the user. For example, two buttons on opposing sides may be provided to be pushed by the user for releasing a locking mechanism, such that the accessory can be released from the main unit. For example, U.S. Pat. No. 5,567,047 describes a handheld blender including a motor assembly and a tool assembly, releasably connectable to the motor assembly. For mounting the tool assembly to the motor assembly, the motor assembly has a U-shaped expansion clamp and the tool assembly has a tool shank with a mounting groove, which is engaged by the U-shaped expansion clamp. To release the tool shank, the expansion clamp is displaced by a push button in the direction of an opposite push button, having expansion surfaces on which the legs of the expansion clamp ride up, thus disengaging the expansion clamp from the mounting groove. Thus, by moving, i.e. activating, the two push buttons in the direction towards each other, the expansion clamp is displaced by a translational movement in its plane in the direction to the push button with the expansion wedge, having expansion surfaces against which the clamp legs abut with their free ends. By reason of the use of two push buttons for releasing the tool shank, whereof one operates to displace the expansion clamp in the direction of the other push button, while at the same time the other push button, acting in opposition to this displacement, urges the expansion wedge into the space between the leg ends of the expansion clamp, the two push buttons are required to travel only a short distance for actuation. EP 1 138 239 B1 describes a handheld mixer, comprising a housing which contains a drive motor and with which a shank part is detachably connected. To couple the shank part to the motor housing, a retaining groove is provided in which a retaining element engages. In order to release the engaging element, a closed ring-like structure is provided as the retaining element, which by applying a pressing force on two opposite sides, is buckled. Since the retaining element is formed as a closed frame structure, the buckling leads to a decrease in the width in direction of the applied pressing forces, and to an increase in the width in an opposite direction. By providing respective projections to engage the retaining groove, on the side portions between the opposite push buttons, the buckling leads to a disengagement of the engaging projections from the retaining groove, thus releasing the attached accessory part. However, it has been shown that upon wear and the entry of dirt, the mechanisms to be activated by the user may require an activation force which contributes to a decrease in experienced user comfort.

FR 2 854 561 relates to a machine for preparing foodstuff and describes a releasably attached tool.

SUMMARY OF THE INVENTION

Hence, there may be a need to provide a releasing mechanism for a handheld kitchen appliance for releasably mounting accessory parts to a main unit with a facilitated way of operation. Of course, such release mechanism should also be economic in terms of manufacturing and assembly costs.

The object of the present invention is solved by the subject-matter of the independent claims, wherein further embodiments are incorporated in the dependent claims.

It should be noted that the following described aspects of the invention apply also for the handheld kitchen appliance interface, for the handheld kitchen appliance, and for the method for releasing an accessory part from a main unit of a handheld kitchen appliance.

According to a first aspect of the present invention, a handheld kitchen appliance interface is provided for releasably mounting of an accessory part to a main unit, comprising a body structure, an insertion opening, a locking device, and an activation device. The insertion opening is provided in the body structure for inserting an insert end of an accessory or of a main part of a handheld kitchen appliance. The locking device comprises at least one engagement element moveably guided by the body structure and being movable between a first position, in which the engagement element is provided to engage a locking element of an insert end of the accessory or the main part inserted into the opening to provide axial fixation of the insert end in relation to the body structure, and a second position, in which the engagement element is provided to be disengaged to allow axial displacement of the insert end in relation to the body structure. The activation device comprises a button for applying a manual release force by the user for releasing the insert end by acting on the locking device. The locking device comprises at least one holding bracket, wherein the at least one holding bracket is supported by the body structure in at least one fixation point such that during an activation of the interface, the fixation point maintains stationary relative to the body structure, and wherein the at least one holding bracket comprises a bendable part on which the engagement element is provided. The manual release force causes a bending of the holding bracket resulting in a radially directed movement of the at least one engagement element from the first to the second position.

The radially directed movement comprises a direction transverse to an insertion direction of the insertion opening.

The term "maintains stationary relative to the body structure" refers to a non-moving or non-displacement of the fixation point in relation to the body structure. Depending on the geometric form of the holding bracket, the fixation point may be provided as being pivotably fixed to the body structure.

The term "a button" comprises an example with only one button. However, the term "a button" also comprises an example of several buttons, for example two buttons. According to an exemplary embodiment, the holding bracket is fixedly connected to the body structure in the at least one fixation point in a non-displaceable manner.

According to the invention, only one button is provided, and the activation device is provided as one-finger actuatable or activatable.

Instead of one button, it is also possible to provide two adjacent buttons, or part-buttons, for example one for a holding bracket or spring member each.

The activation device is operable by one finger only, i.e. with only one button to be pressed for releasing the accessory part or the main part, i.e. the insert end of the accessory part or of the main part.

It must be noted that the handheld kitchen appliance interface may be provided on the main unit, or on the main part, such that the accessory part can be attached to the main unit or disengaged to be detached. The handheld kitchen appliance interface may also be provided on the accessory part. However, in such case, with a different number of accessory parts, these would all have to be equipped with the respective interface, whereas when providing the interface on the main unit, only one interface unit for use of several accessory parts is necessary.

According to an exemplary embodiment, the at least one holding bracket is provided with a fixed end, at which the holding bracket is connected to the body structure at the fixation point, and a free end, upon which the manual release force acts when pressing the button, and which free end cantilevers freely from the fixation point throughout the free end. The cantilever effect is provided by arranging two opposite holding brackets, connected to each other as the fixed ends, and biasing each other.

According to an exemplary embodiment, a single button is provided, and two holding brackets are provided as an open ring-like structure, wherein the ring structure is supported at a fixation point arranged opposite to the button.

The single button may be provided as two separate halves, one for one of the holding brackets each.

According to an exemplary embodiment, two holding brackets are provided as a ring structure with an opening portion between two ring structure ends, wherein the button engages the ring structure ends, and wherein the button is provided with a chamfered insertion portion, having an increasing width, effecting a widening of the opening portion when the button is pressed. Thus, the engagement elements can be moved away from an outer face of the insert end.

The opening force is acting on the opening ends in a tangential direction.

According to an exemplary embodiment, two holding brackets are provided as a ring structure with an opening portion between two ring structure ends, wherein the button engages the ring structure ends, and wherein the button is provided with a tapered recess with a decreasing width effecting a closing of the opening portion when the button is pressed, which closing results in a contracting radial translation of the engagement elements. Thus, the engagement elements can be moved so-to-speak inwardly, for example they can be moved away from an inner side of a hollow structure of an insert end.

Two holding brackets may be provided as two separate parts of a ring structure, forming at least one opening portion, in which the button engages, and two buttons may be provided, wherein two opening portions are provided in each of which one button engages.

According to an exemplary embodiment, the ring structure is provided with an adapted cross-section for adjusting the bending.

According to an exemplary embodiment, a supports structure is provided on the outside of the ring structure for adjusting the bending moment of the ring structure.

According to an exemplary embodiment, at the connection of the first and second holding brackets, a hinge member is provided, and the support structure is a spring element, acting on the holding brackets. Thus, instead of a bending of the complete holding bracket, the bending so-to-speak takes place at the hinge portion only if the holding brackets are provided as stiff members. The support structure then acts as the urging force, urging the engagement elements into the respective recess or groove of the insert end.

The engagement elements may be provided as connecting links to engage a recess of the insert end, for example of the accessory part or the main part. The body structure may comprise a supporting guide for axially fixating the holding brackets. The body structure may further comprise a guide for guiding the movement of the button during its movement.

According to a second aspect of the present invention, a handheld kitchen appliance is provided, comprising a main part and an accessory part. The main part comprises a motor in a housing for driving the accessory part. The main part is provided with a handheld kitchen appliance interface according to one of the above-mentioned examples. The accessory part is provided with a coupling element releasably engaged by the engagement element of the locking device.

According to another example, the accessory part is provided with a handheld kitchen appliance interface according to one of the above-mentioned examples, and the main part is provided with a coupling element releasably engaged by the engagement element of the locking device.

The coupling element may be a coupling groove or coupling recess, into which the engagement element extends in the first position.

In the inserted state, the main part and the accessory part are locked against rotation relative to each other by a rotatable locking coupling. For the rotatable locking coupling, the main part may comprise a reception with a contour, providing a positive locking connection, and the accessory part may comprise an end with a respective counter contour fitting into the reception in an at least partly positive locking way.

According to an exemplary embodiment, the accessory part comprises a rotatable working component, and a driving coupling is provided between the motor and the accessory part when the accessory part is engaged by the engagement element.

The driving coupling may be a positive locking connection for transmitting the rotational forces from the motor to the accessory part and the respective tool provided therewith.

According to a third aspect of the present invention, a method for releasing an accessory part from a main unit of a handheld kitchen appliance is provided, comprising the following steps:

a) pressing a button of a handheld kitchen appliance interface according to one of the above-mentioned examples;
b) thereby bending at least one holding bracket such that the engagement element is radially moved from the first position to the second position; wherein the at least one holding bracket is being supported by the body structure in at least one fixation point that maintains stationary relative to the body structure; and
c) decoupling and removing the accessory part.

According to an aspect of the present invention, the engagement elements are attached to holding members, which are provided at least in one point to be non-moveable in relation to the body structure. Thus, the holding members are only exposed to a bending movement, i.e. a pivoting or rotational movement around the fixation point. Accordingly, the engagement members are also moved in a similar way, i.e. in a radial direction. Thus, by avoiding any translation of the holding member structure, friction forces that occur are reduced to a minimum, thus providing a facilitated way of operating since the user has to apply less activation force. By providing a fixation point, it is further possible to provide only one push button, which means an increase in user comfort, since the need to activate two push buttons is omitted. According to a further aspect, a single button is provided as the human machine interface, used to activate the release mechanism. A ring can be provided as the flexible element activated by the button that moves laterally in order to release the accessory, for example. A reinforcement member or element, or other reinforcement measurements, can be added to modify the stiffness of the ring. Further, the body structure may be provided with a support, wherein this support is provided as a part holding the ring and guiding the button during its movement by means of protrusions and reception openings for receiving the parts to be guided. The fixation point, for example provided as a hinge, fixes the ring in an axial direction, wherein the term axial relates to the insertion direction of the accessory part.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 1 shows a schematic cross-section of an example of a handheld kitchen appliance interface, wherein FIG. 1A shows a position in which an engagement of an accessory part to a main unit is provided, and wherein

FIG. 5 shows a further example of a handheld kitchen appliance interface in first variant in FIG. 5A and a second variant in FIG. 5B;

DETAILED DESCRIPTION OF EMBODIMENTS

Figure 1A:
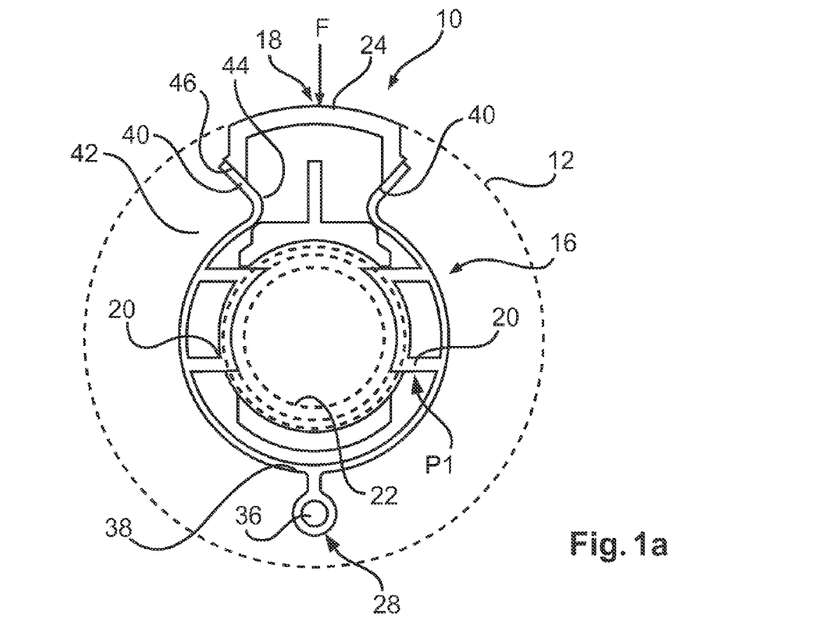
Figure 1B:
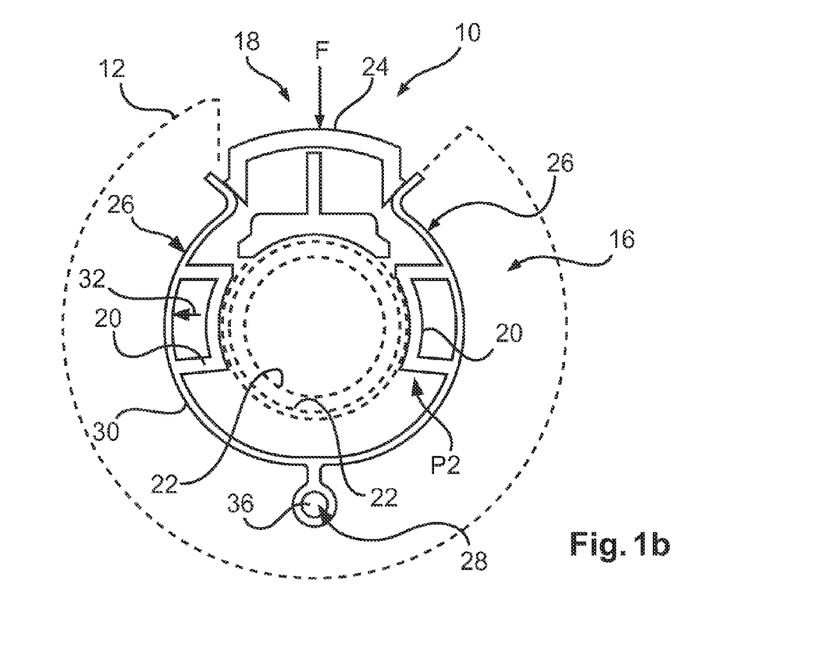
FIG. 1B shows the interface in a state for attaching or detaching the two parts.

FIG. 1 shows a cross-section of a handheld kitchen appliance interface 10 for releasably mounting of an accessory part to a main unit. The handheld kitchen appliance interface 10 is also shown in a perspective view in FIG. 2. The interface 10 comprises a body structure 12, indicated with a dotted line in FIGS. 1A and 1B, and only schematically indicated in FIG. 2. Further, an insertion opening 14 is provided. A locking device 16 and an activation device 18 are further provided. The insertion opening 14 is provided in the body structure 12 for inserting an insert end of an accessory or of a main part of a handheld kitchen appliance. The locking device 16 comprises at least one engagement element 20 that is moveably guided by the body structure 12 and which is movable between a first position P1, shown in FIG. 1A, and a second position P2, shown in FIG. 1B. In the first position P1, the engagement element is provided to engage a locking element of an insert end of the accessory or the main part inserted into the opening to provide axial fixation of the insert end in relation to the body structure. In the second position P2, the engagement element is provided to be disengaged to allow axial displacement of the insert end in relation to the body structure. The counterpart, with which the engagement element is provided to be engaged with, is indicated with a dotted line 22.

The activation device 18 comprises a button 24 for applying a manual release force F by the user for releasing the insert end by acting on the locking device. The locking device 16 comprises at least one holding bracket 26, wherein the at least one holding bracket is supported by the body structure in at least one fixation point 28 such that during an activation of the interface, the fixation point maintains stationary relative to the body structure 12. The at least one holding bracket comprises a bendable part 30, on which the engagement element is provided. The manual release force causes a bending of the holding bracket resulting in a radially directed movement 32 of the at least one engagement element from the first position P1 to the second position P2.

Figure 2:
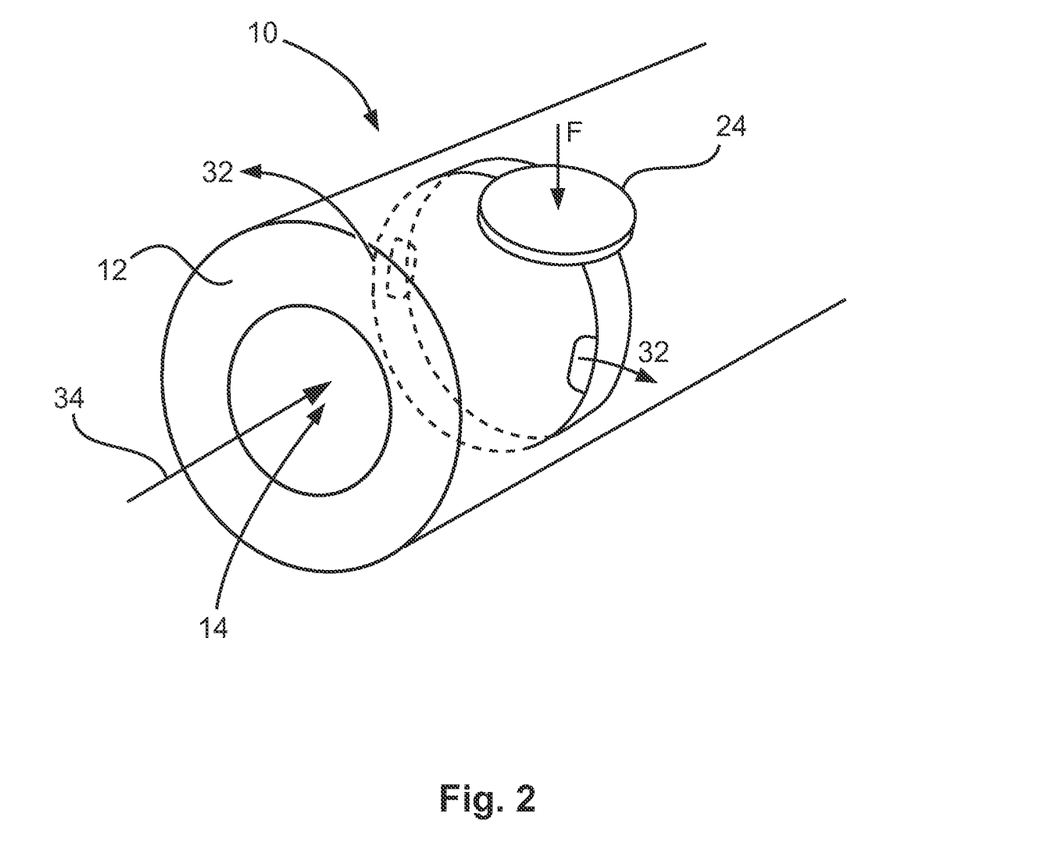
FIG. 2 shows a schematic perspective of an example of a handheld kitchen appliance interface.

In FIG. 2, the locking device 16 is only schematically indicated. As can be seen, the radially directed movement 32 comprises a direction transverse to an insertion direction 34 of the insertion opening 14.

The holding bracket 26 may be fixedly connected to the body structure 12 in the at least one fixation point in a non-displaceable manner, for example shown as a mounting opening 36 in FIGS. 1A and 1B.

According to an example, also shown in relation with FIGS. 1A and 1B, the at least one holding bracket 26 is provided with a fixed end 38, at which the holding bracket is connected to the body structure at the fixation point 28, and a free end 40, upon which the manual release force acts when pressing the button 24, and which free end 40 cantilevers freely from the fixation point 28 throughout the free end.

The two holding brackets 26 may be provided as an open ring structure, wherein the ring structure is supported at the fixation point arranged opposite to the button.

As indicated in FIGS. 1A and 1B also, the two holding brackets 26 are provided as a ring structure 42 with an opening portion 44 between two ring structure ends, namely the free ends 40, wherein the button 24 engages the ring structure ends. For example, the button is provided with a chamfered insertion portion 46 having an increasing width, effecting a widening of the opening portion when the button is pressed.

For example, in the figures, the button 24 is pressed by applying the force F in a downward direction, which can be seen by comparing FIGS. 1A and 1B. Thus, by inserting the chamfered portion 46 into the opening portion 44, the two free ends 40 are urged towards the respective side, thus widening the opening portion 44. By widening the opening portion, i.e. by urging the free ends to the side, the holding brackets 26 are also radially moved, thereby also providing a radial movement of the engagement elements 20.

Figure 3:
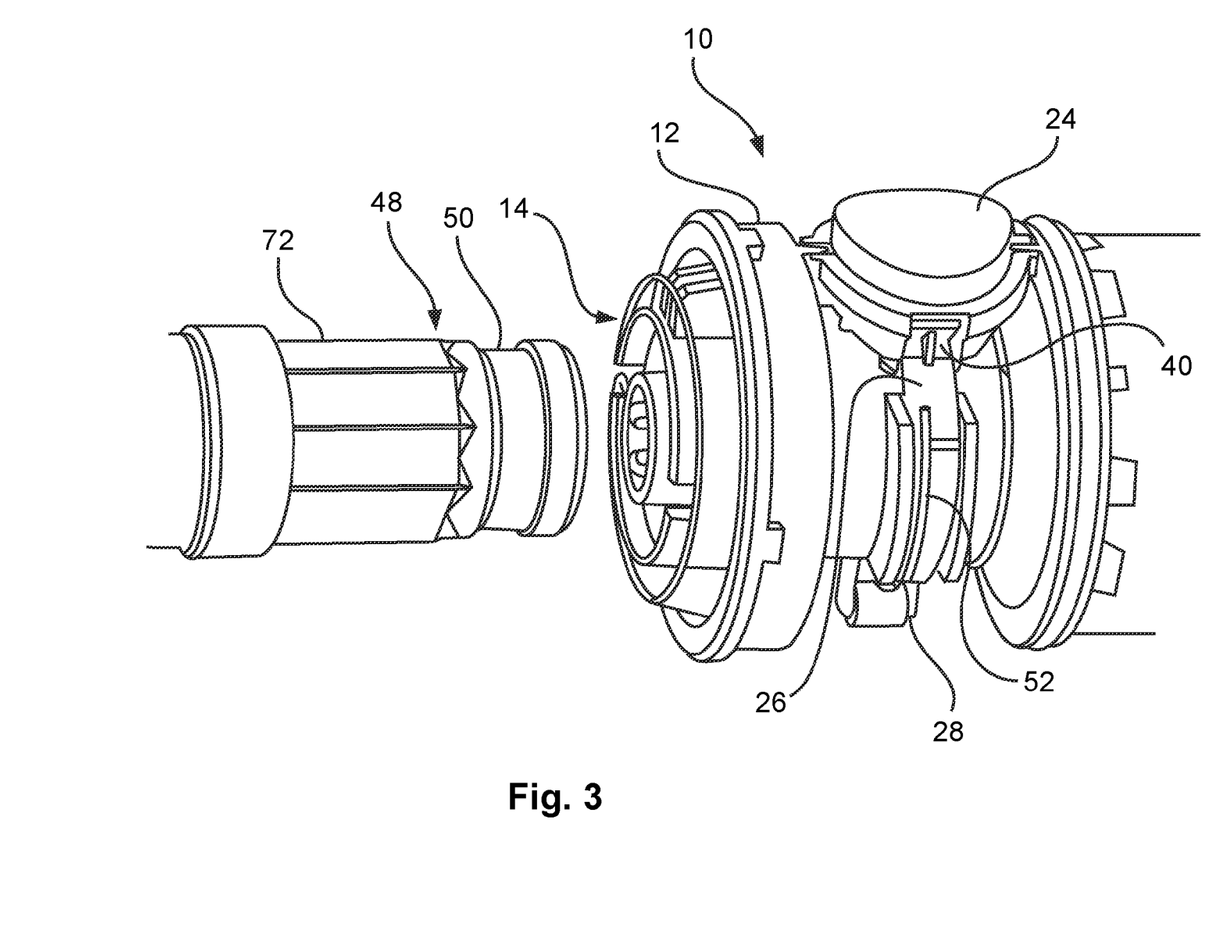
FIG. 3 shows a further perspective view of an example of a handheld kitchen appliance interface.

FIG. 3 shows a further perspective view of a further example of handheld kitchen appliance interface 10. Same reference numerals indicate same features, described in relation with the examples of the previous figures, and also of the following figures.

As can be seen, only one button 24 is provided to act upon the free ends 40 of the holding brackets 26. The insertion opening 14 is shown on the so-to-speak left side in FIG. 3, with an insert end 48 shown next to it. The insert end 48 is provided with a groove structure 50, into which the engagement elements 20 (not further shown in FIG. 3) can engage.

For example, a support structure 52 is provided on the outside of the ring structure of the holding brackets for adjusting the bending moment of the ring structure.

Of course, a support structure can also be provided on the inside of the holding brackets. According to a further example (not further shown), the ring structure, i.e. the holding brackets, is provided with an adapted cross-section for adjusting the bending, i.e. the bending force against which the force applied by the button 24 acts.

For example, the holding brackets could be connected to each other, with a hinge member (not further shown), and the support structure could be a spring element for urging the holding brackets inwardly.

According to a further example (not further shown), the holding brackets could be provided as stiff members, pivotably connected to the fixation point 28 with a hinge (not shown) providing a rotational movement of the bracket member to move the engagement elements between the first and the second position P1 and P2.

Figure 4:
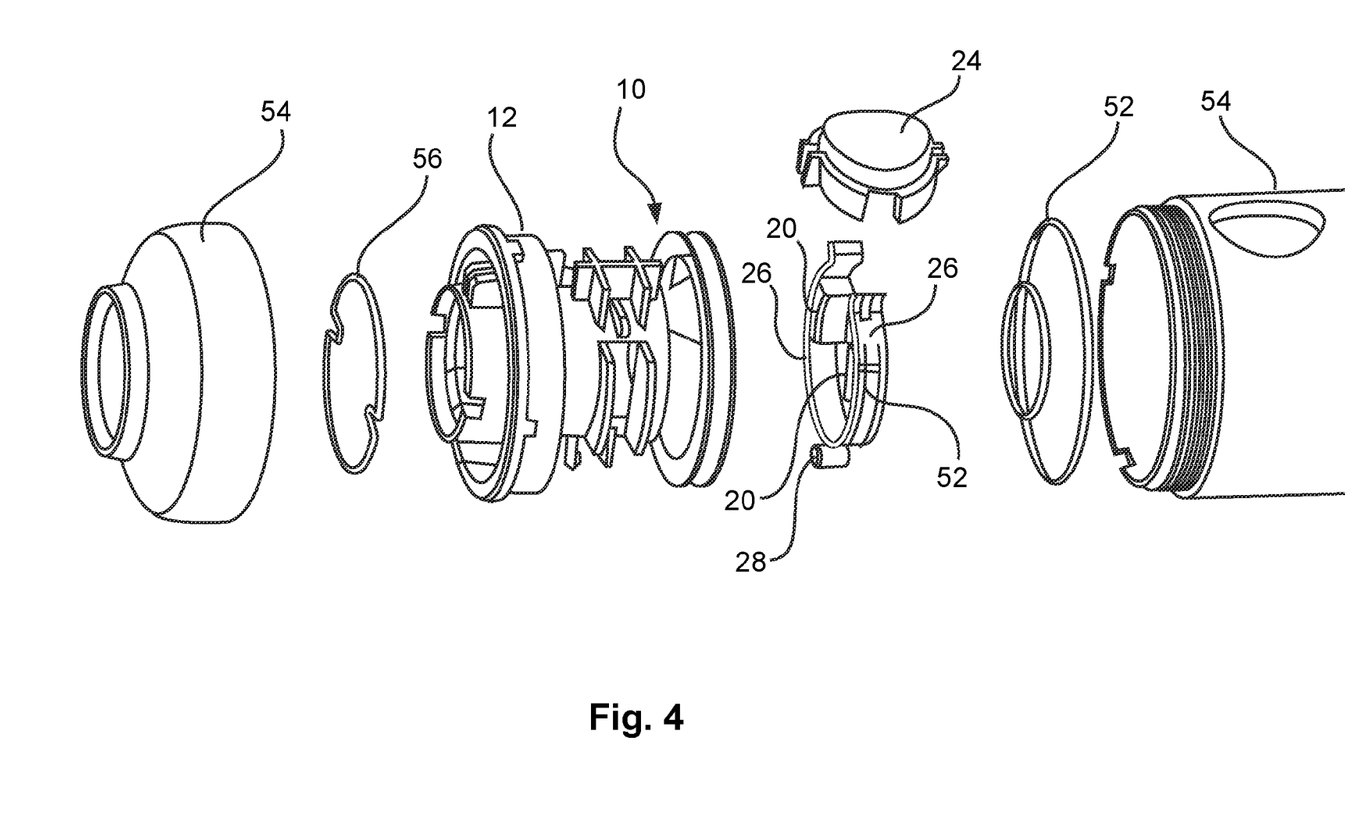
FIG. 4 shows a perspective explosive drawing of the example of FIG. 3.

FIG. 4 shows an explosive illustration of the handheld kitchen appliance interface of FIG. 3. As can be seen, a very limited number of parts is necessary for constructing the interface 10. In addition, also some sealing rings 52 are shown together with housing components 54 for enclosing the interface 10. A further spring element 56, a release spring, for detachably connecting the housing components 54 to the body structure 12 is also shown.

Figure 5A:
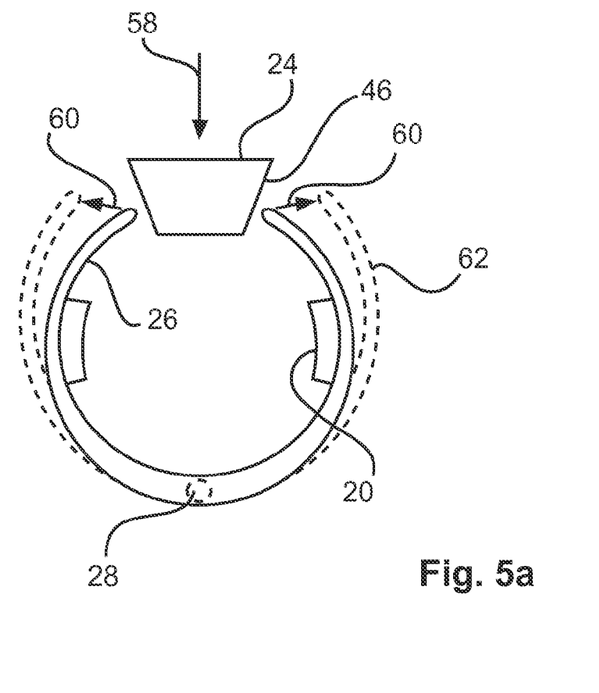

FIG. 5A schematically shows the principle of the above-mentioned example, where the button 24 is provided with the chamfered insert portion 46. Upon pressing the button, indicated by an arrow 58, the free ends of the ring structure are widened, as indicated with arrows 60. Thus, the holding brackets are bended outwardly, as indicated with dotted lines 62. Consequently, also the engagement elements 20 perform a respective radial movement, since the fixation point 28 is provided.

Figure 5B:
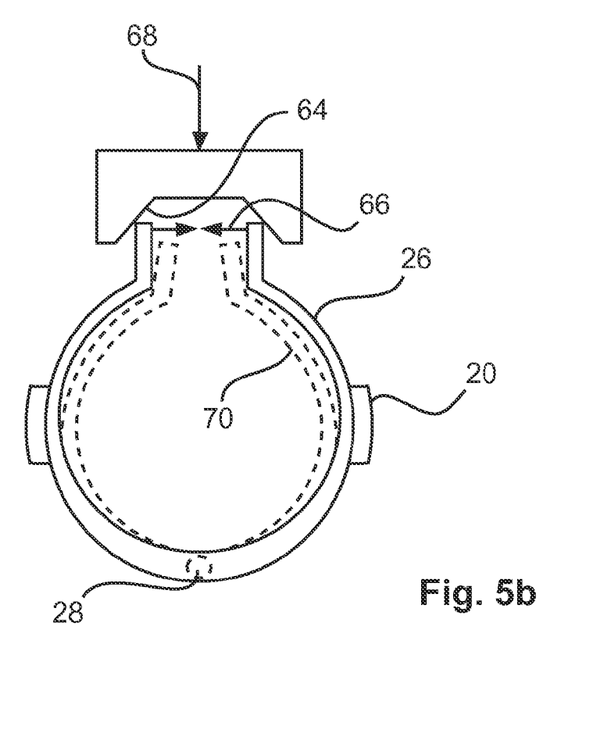

According to a further example, which is indicated in FIG. 5B by the respective principle, the two holding brackets are provided as a ring structure with an opening portion between two ring structure ends, wherein the button 24 engages the ring structure ends. However, contrary to the example of FIG. 5A, the button is provided with a tapered recess 64 with a decreasing width, effecting a closing of the opening portion when the button 24 is pressed, which results in a contracting radial translation of the engagement elements 20. This is indicated in FIG. 5B by arrows 66, indicating the inwardly directed movement of the free ends, which may be provided with an extension for reaching inside the tapered recess 64. Upon pressing the button 24, indicated with arrow 68, the holding brackets 26 are bent inwardly, as indicated with dotted lines 70, performing a so-to-speak pivoting movement around the fixation point 28. Consequently, the holding brackets 26 may be provided with outwardly extending engagement elements 20, which engagement elements would move radially towards each other, such that the respective disengagement would be provided, disengaging the engagement element from an engagement member surrounding the ring-like structure of the holding brackets (which is not further shown).

Figure 6:
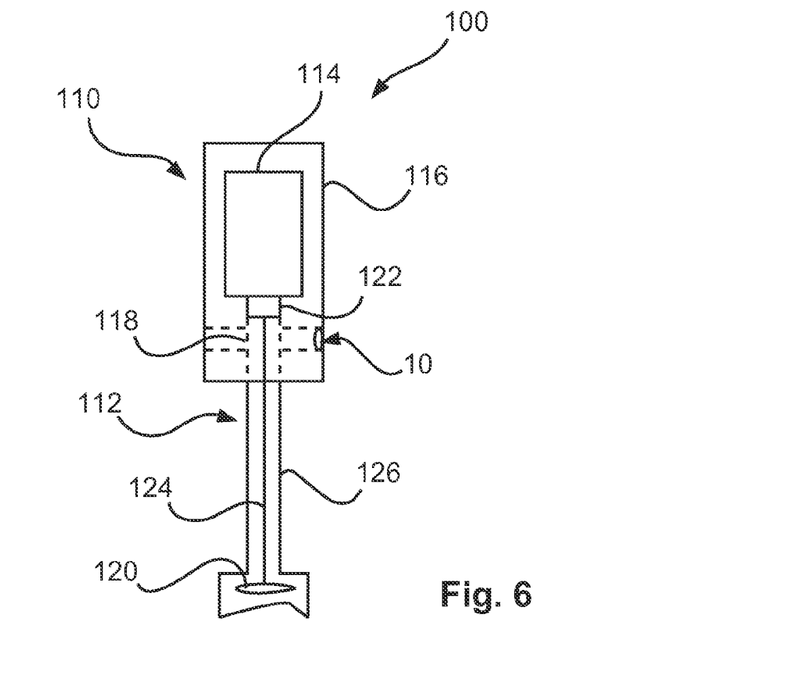
FIG. 6 shows an example of a handheld kitchen appliance in a schematic drawing.

FIG. 6 shows a handheld kitchen appliance 100, comprising a main part 110 in the upper part, and an accessory part 112 below. The main part 110 comprises a motor 114, in a housing 116 for driving the accessory part. The main part, or the accessory part, 110, 112, is provided with a handheld kitchen appliance interface 10 according to one of the above-mentioned examples. The accessory part 112 is provided with a coupling element 118 releasably engaged by the engagement element/engagement elements 20 of the locking device 16 (not further shown in FIG. 6).

It must be noted that the handheld kitchen appliance interface 10 may be provided at the main part 110, or alternatively, at the accessory part 112.

Further, a rotatable locking coupling may be provided such that, in the inserted state, the main part 110 and the accessory part 112 are locked against rotation relative to each other. For example, indicated in FIG. 3, one of the parts, for example the accessory part 112, may be provided with an end with a contour 72, for example as a polygonal outer profile, and the other part, i.e. the main part comprises a reception with a contour, providing a positive locking connection by having a counter contour profile. Thus, the two parts are at least partly positively locked against each other.

The accessory part may comprise a rotatable working component 120 and a driving coupling 122 may be provided between the motor 114 and the accessory part when the accessory part is engaged by the engagement element/engagement elements.

For example, a shaft 124 may be provided for transmitting the rotational movement to the working component 120. Therefore, the accessory part may be provided with an elongated hollow structure 126.

The guiding coupling 122 may be a positive locking connection for transmitting rotational forces from the motor to the accessory part.

Figure 7:
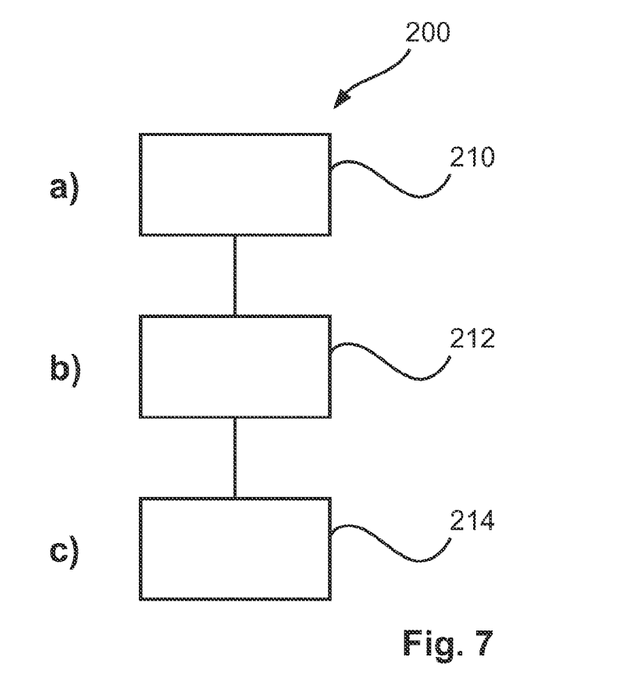
FIG. 7 shows basic steps of an example of a method for releasing an accessory part from a main unit of a handheld kitchen appliance.

FIG. 7 shows a method 200 for releasing an accessory part from a main unit of a handheld kitchen appliance, comprising the following steps: In a first step 210, a button of a handheld kitchen appliance interface according to one of the above-mentioned examples is pressed; in a second step 212, at least one holding bracket is bended by the pressing of the first step 210, such that the engagement element is radially moved from the first position to the second position; wherein the at least one holding bracket is being supported by the body structure in at least one fixation point that maintains stationary relative to the body structure; and a third step 214 is provided in which the accessory part is decoupled and removed.

The first step 210 is also referred to as step a), the second step 212 as step b), and the third step 214 as step c).

According to an example, not further shown, the button of the handheld kitchen appliance interface is pressed and the holding brackets are bended, whereas instead of decoupling and removing the accessory part, the accessory part is inserted and coupled by releasing the button, upon which the holding brackets engage the respective engagement portion of the accessory part.

It should be noted that although the exploded view shows the housing, the front cover and two rings for sealing, these elements, as well as the release spring 56 are not necessary aspects of the release mechanism.

For assembly of the different components, a sequence of the following steps may be provided: fixation of the ring-like structure of the holding brackets, and further also of the release spring on the support of the body structure; positioning of the body structure and the sealing rings in the housing; and closure with the front cover, i.e. the left portion of the housing.

With respect to FIGS. 1A and 1B, it is further noted that when the button moves downward, the ring is deformed in a way that the two arms move laterally, releasing a bar that may be inserted in the insertion opening (not further shown in FIGS. 1A and 1B). By providing a holding bracket structure which is subjected to flexion, less force is required under well-defined load conditions, compared to more complex mechanisms. In particular, by providing the holding brackets in a fixed relation to the body structure at least in the fixation point, a displacement is avoided. Therefore, the movement for releasing has less friction force to be overcome, and therefore less force is required to activate the system.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A handheld kitchen appliance interface for releasably mounting of an accessory part to a main unit, comprising:
    a body structure;
    an insertion opening;
    a locking device; and
    an activation device;
    wherein the insertion opening is provided in the body structure for inserting an insert end of an accessory or of a main part of a handheld kitchen appliance;
    wherein the locking device comprises at least one engagement element moveably guided by the body structure and being movable between a first position (P1), in which the engagement element is to engage a locking element of an insert end of the accessory or the main part inserted into the opening to provide axial fixation of the insert end in relation to the body structure, and a second position (P2), in which the engagement element is to be disengaged from said locking element to allow axial displacement of the insert end in relation to the body structure;
    wherein the activation device comprises a single button for applying a manual release force by the user for releasing the insert end by acting on the locking device;
    wherein the locking device comprises at least one holding bracket supported by the body structure at a fixation point such that, during an activation of the interface, the fixation point remains stationary relative to the body structure;
    wherein the at least one holding bracket comprises a bendable part on which the at least one engagement element is provided; and
    wherein the manual release force causes a bending of the holding bracket effecting a radially directed movement of the at least one engagement element from the first position to the second position.

2. The handheld kitchen appliance interface according to claim 1 wherein the holding bracket is fixedly connected to the body structure in the fixation point in a non-displaceable manner.

3. The handheld kitchen appliance interface according to claim 1 wherein the at least one holding bracket includes a fixed end connected to the body structure at the fixation point and a free end which the manual release force acts when pressing the single button, said free end cantilevering freely from the fixation point throughout the free end.

4. The handheld kitchen appliance interface according to claim 1
    where the at least one holding bracket has an open ring shaped structure and
    disposed opposite to the single button.

5. The handheld kitchen appliance interface according to claim 1 where the at least one holding bracket comprises a ring shaped structure having an open portion disposed between first and second ends,
    the single button including a chamfered insertion portion having an increasing width for effecting a widening of the opening portion when the single button is depressed.

6. The handheld kitchen appliance interface according to claim 1 where the at least one holding bracket comprises a ring shaped structure having an open portion disposed between first and second ends,
    the single button including a tapered recess with a decreasing width for effecting a closing of the opening portion when the single button is depressed, said closing causing a contracting radial translation of the at least one engagement elements.

7. The handheld kitchen appliance interface according to claim 1 where the at least one holding bracket comprises a ring shaped structure having a cross section that is adapted to adjusting the bending force against which the force applied by the single button acts.

8. The handheld kitchen appliance interface according to claim 1 where the at least one holding bracket has an open ring-shaped structure and a support structure is provided on an outside of the ring shaped structure for adjusting a bending moment of said ring shaped structure.

9. The handheld kitchen appliance interface according to claim 8 where the support structure comprises a spring element.

10. The handheld kitchen appliance interface according to claim 1 where the at least one holding bracket comprises first and second stiff members pivotably connected to the fixation point.

11. A handheld kitchen appliance, comprising:
    a main part; and
    an accessory part;
    wherein the main part comprises a motor in a housing for driving the accessory part;
    wherein one of the main part and the accessory part is provided with a handheld kitchen appliance interface comprising:
    a body structure;
    an insertion opening;
    a locking device; and
    an activation device;
    wherein the insertion opening is provided in the body structure for inserting an insert end of an accessory or of a main part of a handheld kitchen appliance;
    wherein the locking device comprises at least one engagement element moveably guided by the body structure and being movable between a first position (P1), in which the engagement element is to engage a locking element of an insert end of the accessory or the main part inserted into the opening to provide axial fixation of the insert end in relation to the body structure, and a second position (P2), in which the engagement element is to be disengaged from said locking element to allow axial displacement of the insert end in relation to the body structure;

wherein the activation device comprises a single button for applying a manual release force by the user for releasing the insert end by acting on the locking device;

wherein the locking device comprises at least one holding bracket supported by the body structure at a fixation point such that, during an activation of the interface, the fixation point remains stationary relative to the body structure;

wherein the at least one holding bracket comprises a bendable part on which the at least one engagement element is provided;

wherein the manual release force causes a bending of the holding bracket effecting a radially directed movement of the at least one engagement element from the first position to the second position; and wherein the other one of the main part and the accessory part is provided with a coupling element releasably engaged by the at least one engagement element of the locking device.

12. A handheld kitchen appliance according to claim 11 where the accessory part comprises a rotatable working component and where a driving coupling is provided between the motor and the accessory part when the coupling element is engaged by the at least one engagement element.

13. A method for releasing an accessory part from a main unit of a handheld kitchen appliance, said method comprising:
   a) pressing a single button of a handheld kitchen appliance interface comprising:
      a body structure:
      an insertion opening;
      a locking device; and
      an activation device;
      wherein the insertion opening is provided in the body structure for inserting an insert end of an accessory or of a main part of a handheld kitchen appliance;
      wherein the locking device comprises at least one engagement element moveably guided by the body structure and being movable between a first position (P1), in which the engagement element is to engage a locking element of an insert end of the accessory or the main part inserted into the opening to provide axial fixation of the insert end in relation to the body structure, and a second position (P2), in which the engagement element is to be disengaged from said locking element to allow axial displacement of the insert end in relation to the body structure;
      wherein the activation device comprises the single button for applying a manual release force by the user for releasing the insert end by acting on the locking device;
      wherein the locking device comprises at least one holding bracket supported by the body structure at a fixation point such that, during an activation of the interface, the fixation point remains stationary relative to the body structure;
      wherein the at least one holding bracket comprises a bendable part on which the at least one engagement element is provided;
   b) applying to the single button sufficient force to bend the at least one holding bracket such that the engagement element is radially moved from the first position to the second position; and
   c) decoupling and removing the accessory part.

* * * * *